US011887558B1

(12) United States Patent
Srinivasan et al.

(10) Patent No.: US 11,887,558 B1
(45) Date of Patent: Jan. 30, 2024

(54) METHOD AND APPARATUS FOR MEMORY MANAGEMENT IN A VIDEO PROCESSING SYSTEM

(71) Applicant: XILINX, INC., San Jose, CA (US)

(72) Inventors: Krishnan Srinivasan, San Jose, CA (US); Qingyi Sheng, San Jose, CA (US); Kam-Wang Li, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/144,692

(22) Filed: May 8, 2023

(51) Int. Cl.
*G09G 5/00* (2006.01)
(52) U.S. Cl.
CPC ..... *G09G 5/003* (2013.01); *G09G 2310/0264* (2013.01); *G09G 2360/122* (2013.01)
(58) Field of Classification Search
CPC .. G09G 5/003; G09G 2360/122; G09G 5/393; G09G 5/395; G09G 2360/121; G09G 2360/125
See application file for complete search history.

(56) References Cited

U.S. PATENT DOCUMENTS

2009/0244086 A1* 10/2009 Miyasaka ............ H04N 13/354
345/589
2017/0162179 A1* 6/2017 Bogusz ............... G06F 12/1027

* cited by examiner

*Primary Examiner* — Nelson M Rosario
(74) *Attorney, Agent, or Firm* — Patterson + Sheridan, LLP

(57) ABSTRACT

An integrated circuit (IC) includes a video buffer memory and display driver circuitry. The video buffer memory includes a buffer memory map. The video buffer memory stores one or more raster lines of video data organized as tiled lines. Each of the tiled lines including two quartiles. The display driver circuitry is coupled to the video buffer memory. The display driver circuitry writes data associated with a portion of a first data line to a first one of the two quartiles of a first one of the tiled lines, and updates the buffer memory map. Further, the display driver determines a full display line being present within the video buffer memory based on the buffer memory map. The display driver further outputs the full display line to a display device.

20 Claims, 14 Drawing Sheets

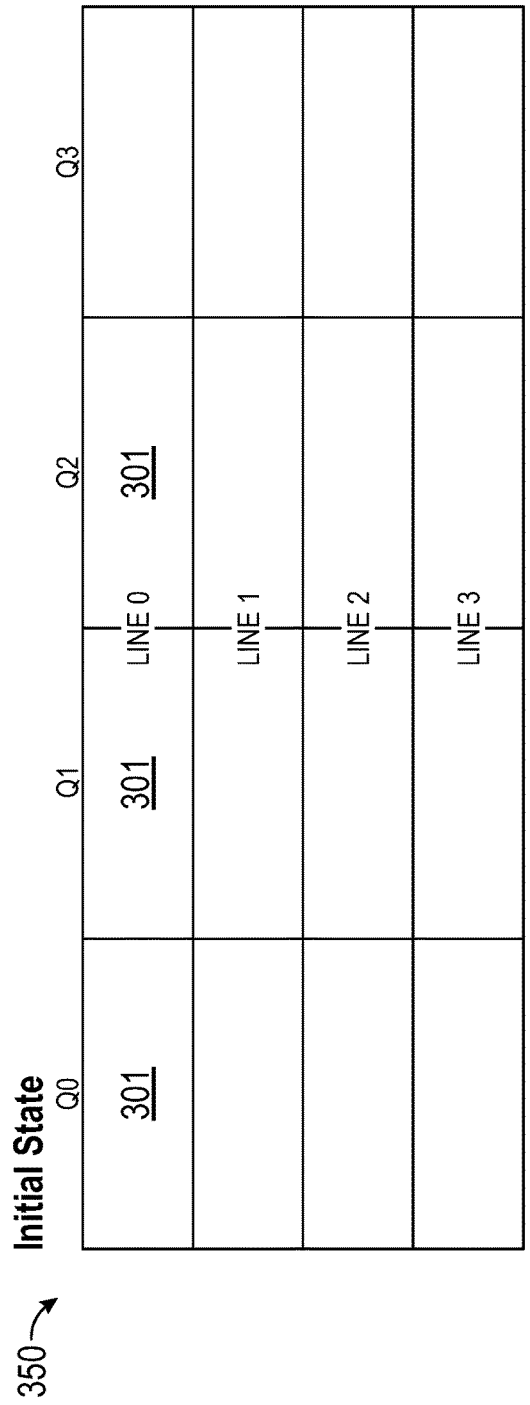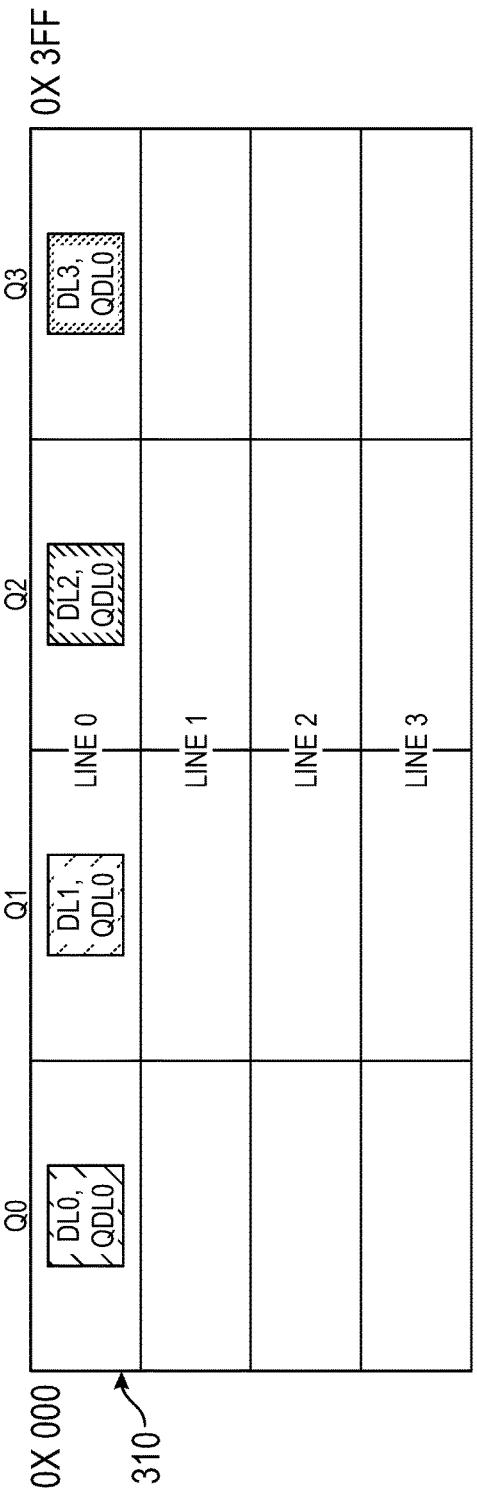

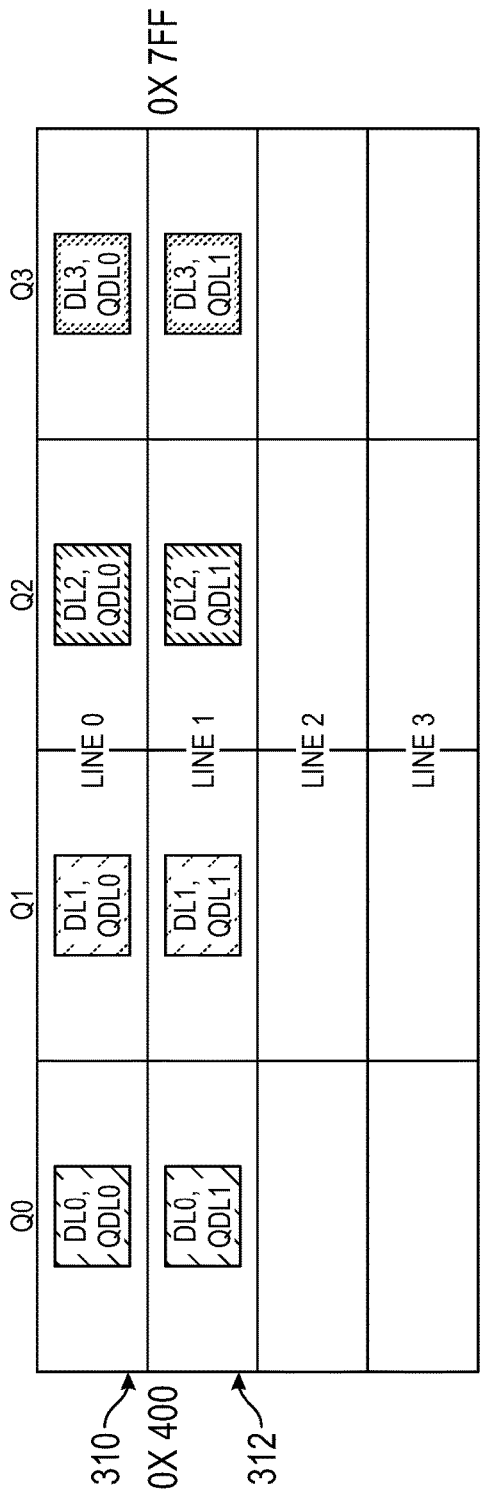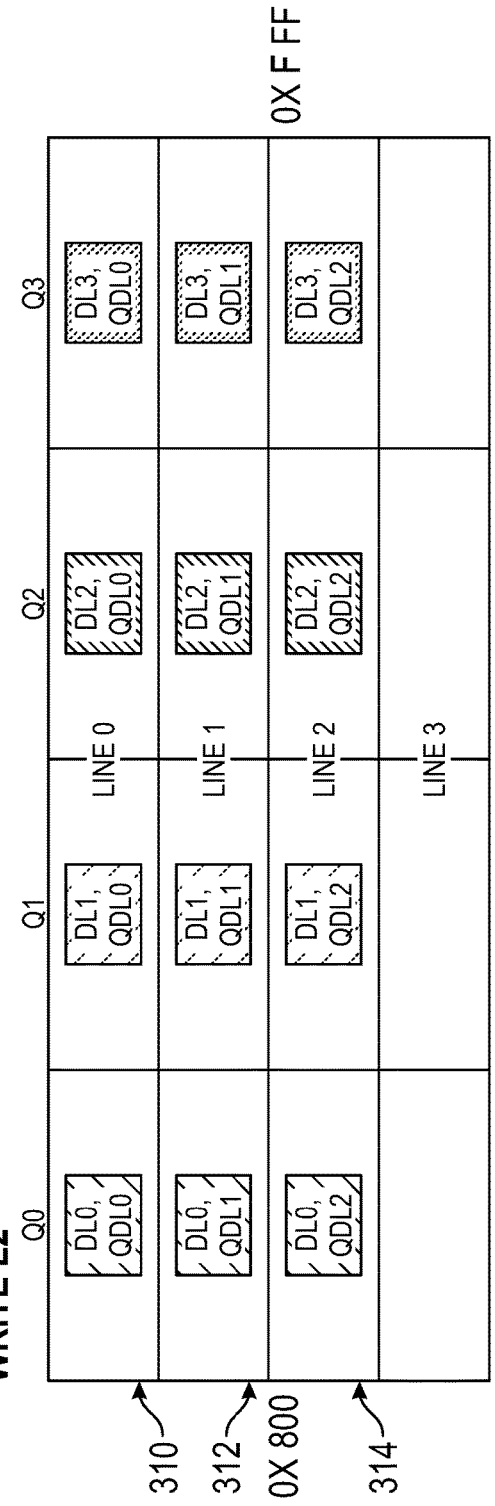

WRITE L3 and READ DL0 (Read from SRAM and Send to Video Processor)

| | Q0 | Q1 | | Q2 | Q3 | |
|---|---|---|---|---|---|---|
| | 319 | DL1, QDL0 | LINE 0 | DL2, QDL0 | DL3, QDL0 | |
| | 319 | DL1, QDL1 | LINE 1 | DL2, QDL1 | DL3, QDL1 | |
| | 319 | DL1, QDL2 | LINE 2 | DL2, QDL2 | DL3, QDL2 | |
| | 319 | DL1, QDL3 | LINE 3 | DL2, QDL3 | DL3, QDL3 | 0X FFF |

320 → (row 1), 322 → (row 2), 324 → (row 3), 0X 600 / 326 → (row 4)

FIG. 4E

WRITE L4 and READ DL1

| | Q0 | Q1 | | Q2 | Q3 |
|---|---|---|---|---|---|
| | DL4, QDL0 | 332 | LINE 0 | DL2, QDL0 | DL3, QDL0 |
| | DL5, QDL0 | 332 | LINE 1 | DL2, QDL1 | DL3, QDL1 |
| | DL6, QDL0 | 332 | LINE 2 | DL2, QDL2 | DL3, QDL2 |
| | DL7, QDL0 | 332 | LINE 3 | DL2, QDL3 | DL3, QDL3 |

WRITE L7 and READ DL4

| Q0 | Q1 | | Q2 | Q3 |
|---|---|---|---|---|
| 344 | 344 | LINE 0 | 344 | 344 |
| | DL5, QDL1 | LINE 1 | DL5, QDL2 | DL5, QDL3 |
| | DL6, QDL1 | LINE 2 | DL6, QDL2 | DL6, QDL3 |
| | DL7, QDL1 | LINE 3 | DL7, QDL2 | DL7, QDL3 |

WRITE L8 and READ DL5

| Q0 | Q1 | | Q2 | Q3 |
|---|---|---|---|---|
| DL8, QDL0 | DL9, QDL0 | LINE 0 | DL10, QDL0 | DL11, QDL0 |
| 348 | 348 | LINE 1 | 348 | 348 |
| | DL6, QDL1 | LINE 2 | DL6, QDL2 | DL6, QDL3 |
| | DL7, QDL1 | LINE 3 | DL7, QDL2 | DL7, QDL3 |

METHOD AND APPARATUS FOR MEMORY MANAGEMENT IN A VIDEO PROCESSING SYSTEM

TECHNICAL FIELD

Examples of the present disclosure relate generally to memory management techniques within video processing systems, and particularly with respect to those used in high-resolution video display systems. The disclosure has specific application to high-speed integrated video processors that produce high-resolution rasterized video images.

BACKGROUND

High resolution video display systems are continuously improving to keep pace with ever-expanding physical display sizes. Increasing display sizes, in turn, permit a resultant ability to increase the video image resolutions as determined by the number of pixels used in the display and the frequency of rendering. Video processing systems are able to render at greater than a 4 k pixel rate and greater than 60 frames per second. As the manufacturing cost of video display technologies has decreased, the demand for these larger displays has increased. Display sizes in the range of fifty-two inch to greater than ninety inch displays, as measured across the display diagonal, are now commonly seen in private and public venues. Even larger displays, measured in feet and meters, are now seen on roadside advertising billboards and within metropolitan cityscapes. In the past, the manufacturing technologies needed to make these display sizes were cost prohibitive.

In concert with the larger displays, an increase in video display resolution has been made possible through advancements in the video processing systems controlling those displays. In fact, larger displays necessarily produce visual image distortion if the image resolution is not increased to match increases in the display's physical size. From a human eyesight perspective, the resolution of a video image (with 20/20 vision) is about one minute of arc. Thus, in full HDTV resolution—i.e. 1280 pixels×720 pixels, a one minute of arc implies that the TV watcher should sit 4 times the height of the screen away from the display. Outside this calculated viewing distance, individual pixels within the display cannot be resolved by the well-sighted human eye. One way to compensate for the limitations of human eyesight when perceiving larger displays is to increase the image resolution displayed on them. This has prompted the development of higher resolution displays, such as 4K (4096×2160 pixels) and greater.

These advancements have placed significant constraints on the manufacture of integrated circuits (ICs) that control such displays, and specifically the ICs that are used to implement video processing systems. In particular, memory capacity for image storage and processing is always at a premium.

SUMMARY

In one example, an integrated circuit (IC) includes a video buffer memory and display driver circuitry. The video buffer memory includes a buffer memory map. The video buffer memory stores one or more raster lines of video data organized as tiled lines. Each of the tiled lines including two quartiles. The display driver circuitry is coupled to the video buffer memory. The display driver circuitry writes data associated with a portion of a first data line to a first one of the two quartiles of a first one of the tiled lines, and updates the buffer memory map. Further, the display driver determines a full display line being present within the video buffer memory based on the buffer memory map. The display driver further outputs the full display line to a display device.

In one example, a method includes storing one or more raster lines of video data within a video buffer memory. The video buffer memory is organized as tiled lines. Each tiled line including two quartiles. Further, the method includes writing data associated with a portion of a first data line to a first one of the two quartiles of a first one of the tiled lines, and updating buffer memory map of the video buffer memory. The method further includes determining a full display line being present within the video buffer memory based on the buffer memory map, and outputting the full display line to a display device.

In one example, a display driver circuitry writes data associated with a portion of a first data line to a first one of two quartiles of tiled line, and updates a buffer memory map of a video buffer memory. The video buffer memory stores one or more raster lines of video data and is organized as tiled lines. Further, the display driver determines a full display line being present within the video buffer memory based on the buffer memory map, and outputs the full display line to a display device.

BRIEF DESCRIPTION OF DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of the scope of the claims.

FIG. 4A shows the computer memory organization of FIG. 3A as populated with video data in an initial state according to certain aspects of the present disclosure.

FIG. 4B shows the computer memory organization of FIG. 4A in a next state of data processing according to certain aspects of the present disclosure.

FIG. 4C shows the computer memory organization of FIG. 4B in a next state of data processing according to certain aspects of the present disclosure.

FIG. 4D shows the computer memory organization of FIG. 4C in a next state of data processing according to certain aspects of the present disclosure.

FIG. 4E shows the computer memory organization of FIG. 4D in a next state of data processing according to certain aspects of the present disclosure.

FIG. 4F shows the computer memory organization of FIG. 4E in a next state of data processing according to certain aspects of the present disclosure.

FIG. 4I shows the computer memory organization of FIG. 4H in a next state of data processing according to certain aspects of the present disclosure.

FIG. 4J shows the computer memory organization of FIG. 4I in a next state of data processing according to certain aspects of the present disclosure.

Figure 1:
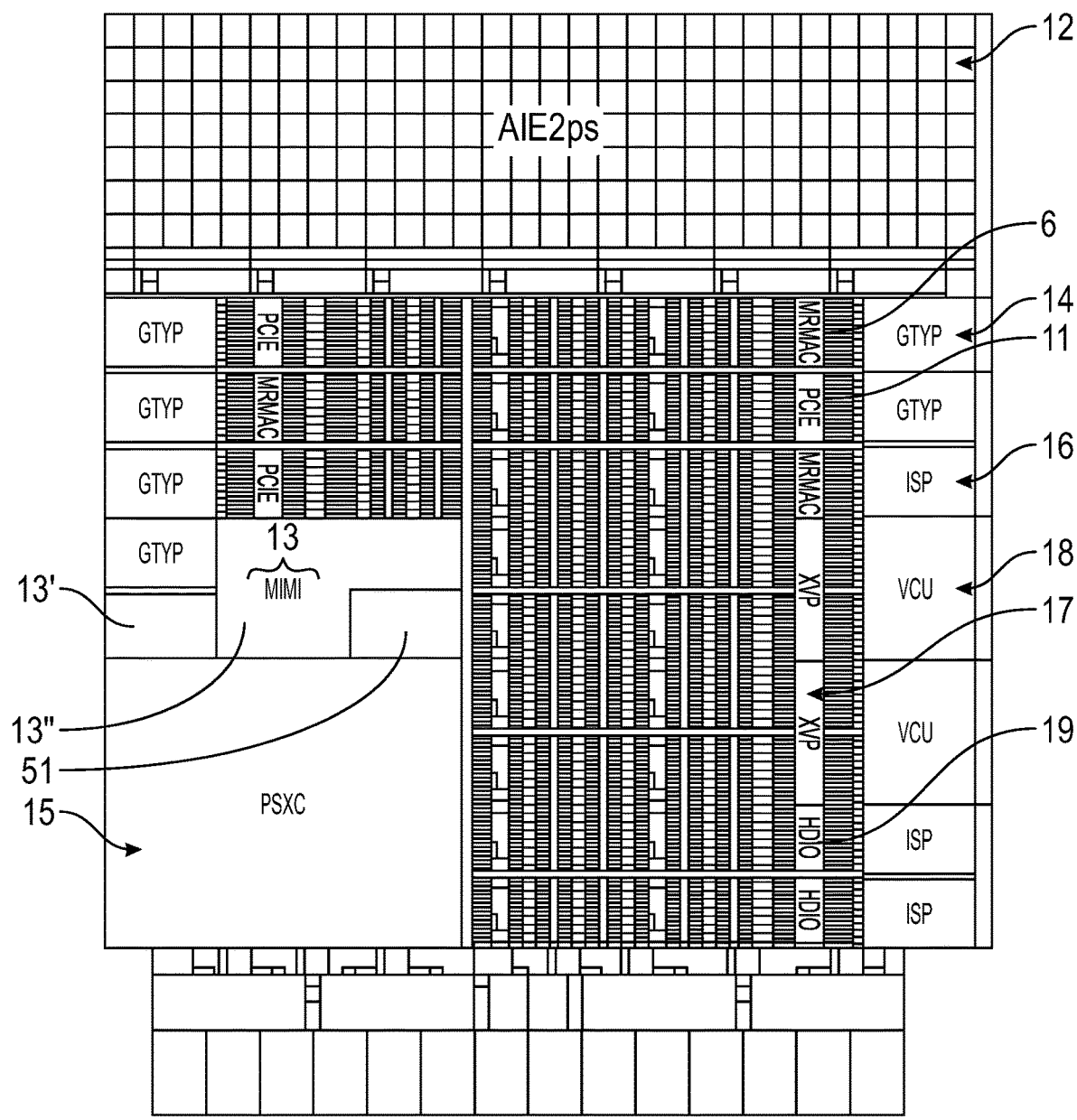
FIG. 1 is a block diagram illustrating an example integrated circuit device, in which aspects of the present disclosure may be practiced.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. The figures are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

DETAILED DESCRIPTION

Examples of the present disclosure generally relate to a method for buffer management in a video processing system. An image file typically includes three video image components (Y, CB, and Cr). For completeness, Y is the luma (brightness) component of the image file, and CB and CR are the blue-difference and red-difference chroma components of the image file. In other examples, an image file may be represented by other image components. Each of the video image components is represented by a tile group. Each tile in a tile group represents one or more video pixels. In one example, each pixel is an 8 bit (1 byte) data word representing the form and color information based on the video image components of the image to be displayed at a particular location within the image. In other examples, each pixel is less than 8 bits or greater than 8 bits (e.g., 10, 12, 16 or more). The three image components may be represented by an M×M matrix of pixels. To increase the size of the corresponding image to support higher resolutions (e.g., 1920×1080 pixels, 2048×1080 pixels, 4096×2160 pixels, or more), the tile count is increased. Further, to display the overall image, each component sub-image is converted to a "rasterized" format. However, the processing resources and memory resources increase as the resolution increases, increasing the processing time and cost of the corresponding display driver circuitry. Further, the processing to increase the resolution of an image file takes place in bulk on the full individual images, stored in tile format. As these files are conventionally stored on the memory of the display driver circuitry, the size of the memory within the display driver circuitry is increased to support the conversion process, increasing the cost of the display driver circuitry, the number of full individual images converted is reduced, reducing the refresh rate supported by the display driver, and/or the maximum resolution supported by the display driver is reduced.

In the following disclosure, a system and method for converting an image file is described in which the total amount of video buffer storage is reduced and the unused portions of that memory are minimized. Conventionally, seven line buffers are used for the tile to raster conversion. However, by dynamically managing the line buffers as described herein, less than seven line buffers may be used. For example, the total number of line buffers is reduced to four line buffers. As is described in further detail in the following, the tiles of each component sub-image are remapped into N×N tiles, where N is greater than 1. In one example, remapping the tiles of each component sub-image includes row aligning. Based on the tiles being read out for raster conversion, a component sub-image and the tiles are column aligned within the empty tiles. In another example, the tiles are column aligned, and subsequently row aligned. Accordingly, the process of row or column aligning the tiles, and reusing empty tiles reduces the memory requirements used to store the tiles for raster conversion, reducing the cost of the corresponding display driver, and/or allowing a display driver to support high resolutions.

Example Video Processing Subsystem

FIG. 1 is a block diagram illustrating an example architecture for an integrated circuit (IC) device 10. The IC device 10 may be a field programmable gate array (FPGA) or an application specific IC (ASIC), among others. In one or more examples, the IC device 10 is a programmable IC device. In one example, the IC device 10 is customized for a particular use such as within a video processing system. In one or more examples, the IC device 10 is at least part of a graphics processing unit (GPU). In one example, the IC device 10 may be referred to as a video processing system.

The IC device 10 may be at least part of a systems-on-a-chip (SoC). SoCs consists of very large transistor counts on a single IC and often contain millions or even billions of transistors. Within a SoC, a collection of components and/or systems (designed as Intellectual Properties (IPs)) are interconnected to perform specified functions. SoCs usually contains one or more processors, co-processors, digital signal processing (DSP) cores, internal memory, memory controllers for external memory, buses/interconnect architectures, peripherals (timer, interrupt controller, etc.), and/or 1/O channels and interfaces to external circuitry. An SoC may include digital circuitry, analog circuitry, FPGA circuitry, and full custom or semi-custom silicon blocks of IP. In one or more examples, an SoC is a mixture of an ASIC, including full-custom and semi-custom (standard cells), and reusable Intellectual Property (IP) blocks (also called macros, hard macros, or cores). The IP, core-based design approach is primarily used to reduce design complexity and time to market. There are different IP cores supplied by different vendors in different technologies of different specifications. Customizable soft cores provide essential sets of pre-verified parameters to configure particular circuitry according to the customer requirements. Interface logic generally support standard buses to ease integration with non-ASIC system components.

The IC device 10 is at least part of a video processing SoC that consists of plurality of video processing blocks. Video processing blocks are IPs used in video processing chips serving video and computer vision applications. The video processing blocks of the IC device 10 include: AIE2ps (Artificial Intelligence (AI) Engine) 12, ISP (image signal processor) 16, VCU (video codec unit) 18, XVP (a proprietary virtual platform) 17, HDIO (high density input output banks) 19, GTYP (transceivers connecting certain PCIe lanes and debug controllers to I/O pins) 14, MRMAC (integrated 100G Multirate Ethernet MAC) 6, PCIE (Peripheral Component Interconnect Express) 11, and PSXC (SoC processor) 15. In other examples, the IC device 10 may include a different combination of video processing circuits, including video processing circuits not illustrated in FIG. 1 and omitting one or more video processing circuits illustrated in FIG. 1. With respect to the video processing, the MMI (multimedia integrated block) circuitry 13 is included and contains a display circuitry 13'; and associated video memories (dynamic random access memory (DRAM) and static RAM (SRAM)) 13". Such video memories include large-storage DRAM for full image storage, and faster, more expensive video buffer memory(ies) such as DDR (double data rate) SRAMs. Although this disclosure is particular to the display controller and associated memories that reside within the MMI 13, the teachings herein are not particular to this configuration and can be located anywhere on configurable device 10.

In general, the video data is selected from a main memory within video storage areas, that video data is processed and transmitted out to the display port. From there, the video may be displayed on any display device such as monitors and screens. An image for processing (e.g., by the IC device 10 of FIG. 1) is represented by the component sub-images associated with Y, Cb, and Cr, of the YCbCr color space. YCbCr is a family of color spaces that are used as a part of the color image pipeline in video and image systems. In one example, the three color images in the red, green, and blue color spaces are transformed to the YCbCr color spaces for more sophisticated and enhanced digital processing. YCbCr is a practical approximation to color processing and perceptual uniformity, where the primary colors corresponding roughly to red, green and blue are processed into perceptually meaningful information. Using the YCbCr color space, subsequent image/video processing, transmission and storage can perform operations and remove errors in perceptually meaningful ways. For example, YCbCr may be used to separate out a luma signal (Y) that can be stored with high resolution or transmitted at high bandwidth, while the two chroma components (CB and CR) can be bandwidth-reduced, subsampled, compressed, or otherwise treated separately for improved system efficiency.

Figure 2A:
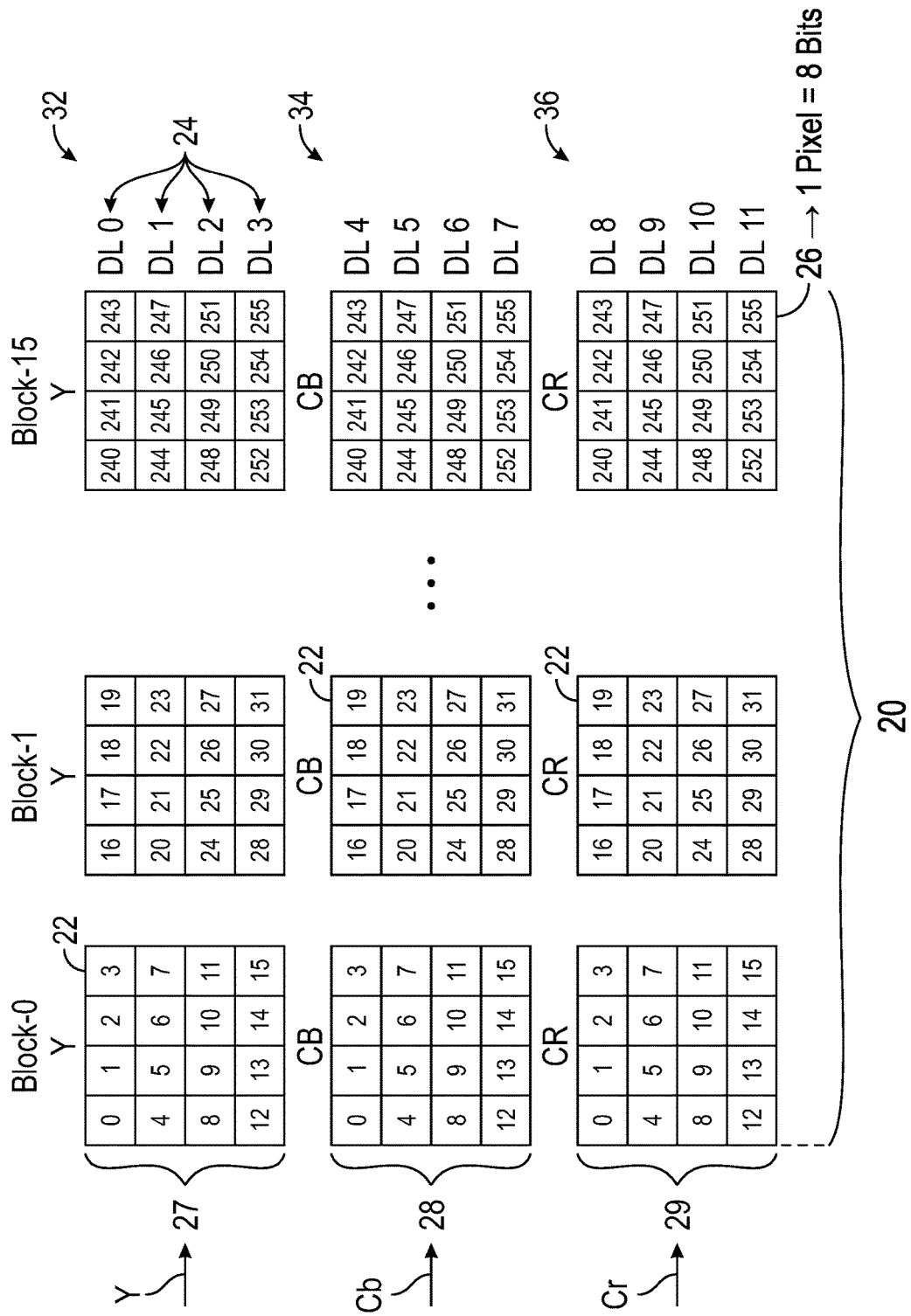
FIG. 2A shows a data diagram illustrating the conversion of video data between two standard formats according to certain aspects of the present disclosure.
Figure 2A:
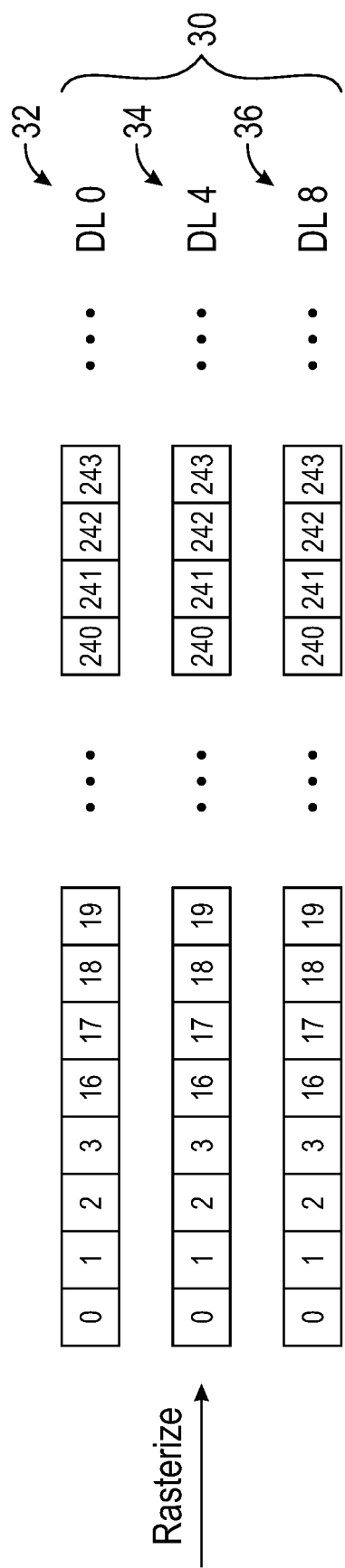

With further reference to FIG. 2A, the three video image components Y, Cb and Cr of image 200 are shown as stored in memory in a full-image "tiled" format 20. Tile group 27 represents the overall Y image component. Tile group 28 represents the overall Cb image component. Tile group 29 represents the overall Cr image component. In the example of FIG. 2A, each of image tiles 22 represents a 4×4 matrix of pixels, where each pixel 26 is an 8-bit (1 byte) data word representing the form and color information from the YCbCr images at a particular location in the respective video image. In other examples, a pixel may be greater than or less than 8-bit.

Abbreviated image portions are shown in FIG. 2A for the simplicity of illustration. There, each of the three image components is shown as a series of 16 tiles each containing 16 pixels, for a total image segment size of 255 bytes and resulting in a sub-image resolution of 64×4. Large images are created by extending the tile count shown in FIG. 2A both horizontally and vertically to achieve the desired resultant image size. For example, a 4K image of 4096×2160 pixels would be created by extending tile sets 27, 28 and 29 into 64 groups horizontally with the entire tile set line duplicated vertically in 546 identically-sized vertically disposed rows. The teaching of this disclosure have been minimized in size to illustrate the general concepts which, in practice, are extended to larger displays.

The various digital image effects and transformations are performed within a main video memory. As such, most of this processing takes place in bulk on the full individual images, stored in tile format, directly in the main video memory. The "tile" organization of this data allows for various "regions" of the overall image to be isolated for individual processing as well as for "quick indexing" of closely associated memory addresses related to that processing. However, the "tile" format of the image(s) results in a spatially-organized pixel identification paradigm, i.e. pixels are numbered sequentially within tiles rather than line-by-line. To display the overall image, each color component sub-image is converted to a "rasterized" format, where each display line 24 is presented output on a line-by-line basis. For full display purposes, each line of three color component is converted into an RGB format (e.g., multiplied by one or constants) and displayed. The display lines (DL) 24 are output line-by-line, from top-left of the display to the bottom right of the display. Thus, the luma image component "line 1", DL0 32, followed by DLs1-3 is output to complete the display of the luma image component. Subsequently, Cb image "line 1", DL4 34, of the Cb image component is output followed by DLs 5-7 to complete the display of the Cb image component. Finally Cr image "line 1", DL8 36. of the Cr image component is output followed by DLs 9-11 to complete the display of the Cr image. The output of the three overlapped image planes results in the recreation of the full image, the overall image containing all three color components, for presentation and perception on the visual display. This is typically performed at a refresh rate of 60 Hz (i.e. 60 full images per second). In other examples, refresh rates of less than or greater than 60 Hz may be used. As can be appreciated, the video processing and associated video memory storage demands are extensive when creating these high-resolution images, increasing the cost of the corresponding IC device.

The display circuitry 13' executes the "tile to raster" conversion. In doing so, the display circuitry 13' creates the video display lines by reading from main video memory and concatenating pixel information for DL0, DL 4 and DL8. Such a process disregards the sequential pixel numerical nomenclature and reading out, with respect to the luma image component, pixels 0, 1, 2, 3 (of block 0); 16, 17, 18, 19 (of block 1); 32, 33, 34, 35 (of block 2); and so on through to pixels 240, 241, 242, 243 (of block 15). These pixels are then stored in a higher-speed, temporary video buffer memory within video memory 13". From there, the image data is read out of the video buffer memory and presented to the display port and displayed on the video display. The actual display process is very high speed and therefore stresses the data capacities and capabilities of the IC device 10. For this, a faster, more volatile memory (e.g. DDR SRAM) than that used for full image storage may be use. This memory is managed to write in, store, and read back out the DL data. The display circuitry 13' or a separate memory manager circuitry 51 within MMI circuitry 13 may be used to coordinate the memory operations as desired by the system designer. Regardless of the actual memory management entity, the video process is considered as including a memory manager for the purpose of this disclosure.

Figure 2B:
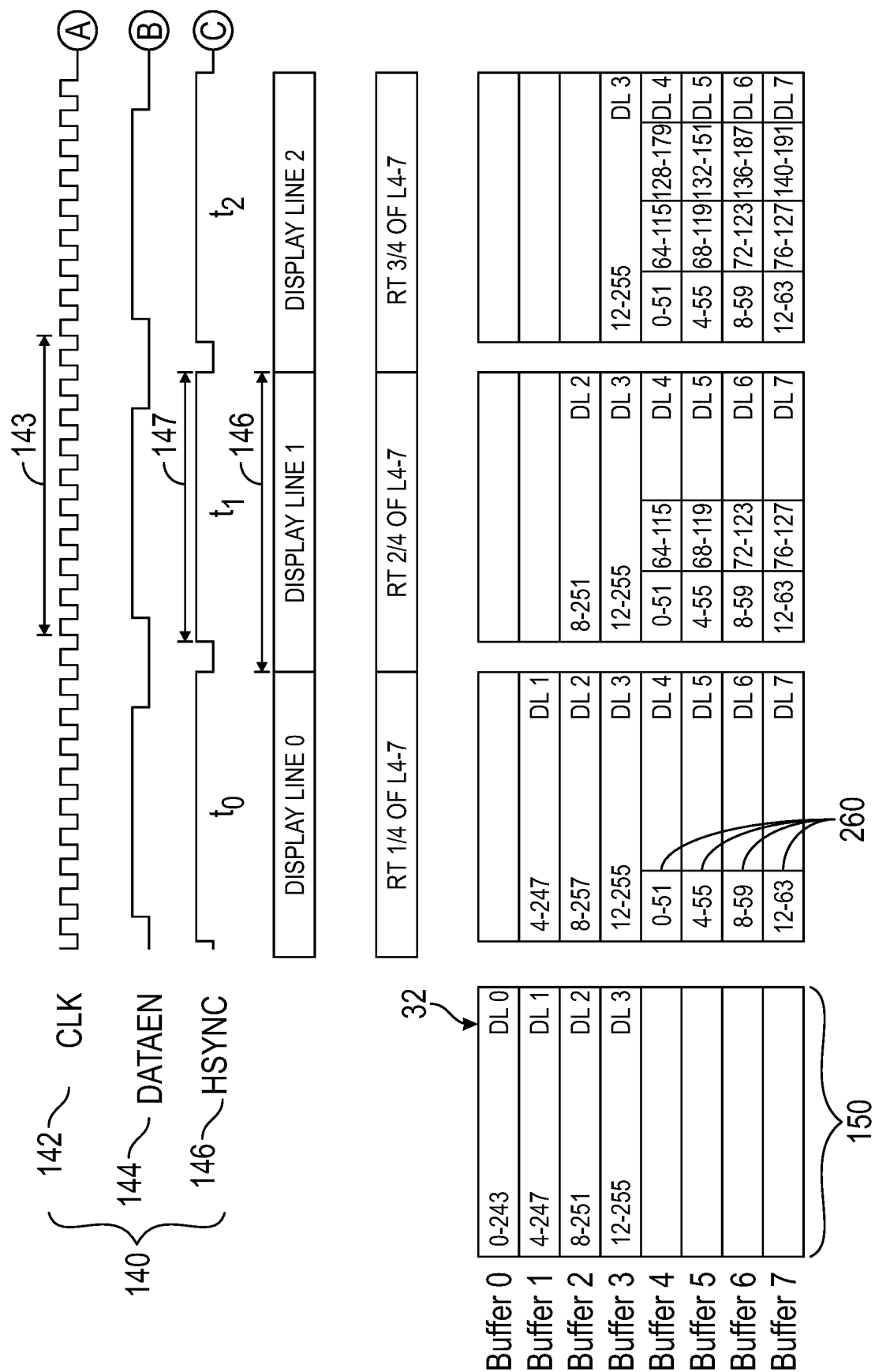
FIG. 2B shows a physical computer memory organization illustrating one method of video data storage according to certain aspects of the present disclosure.
Figure 2B:
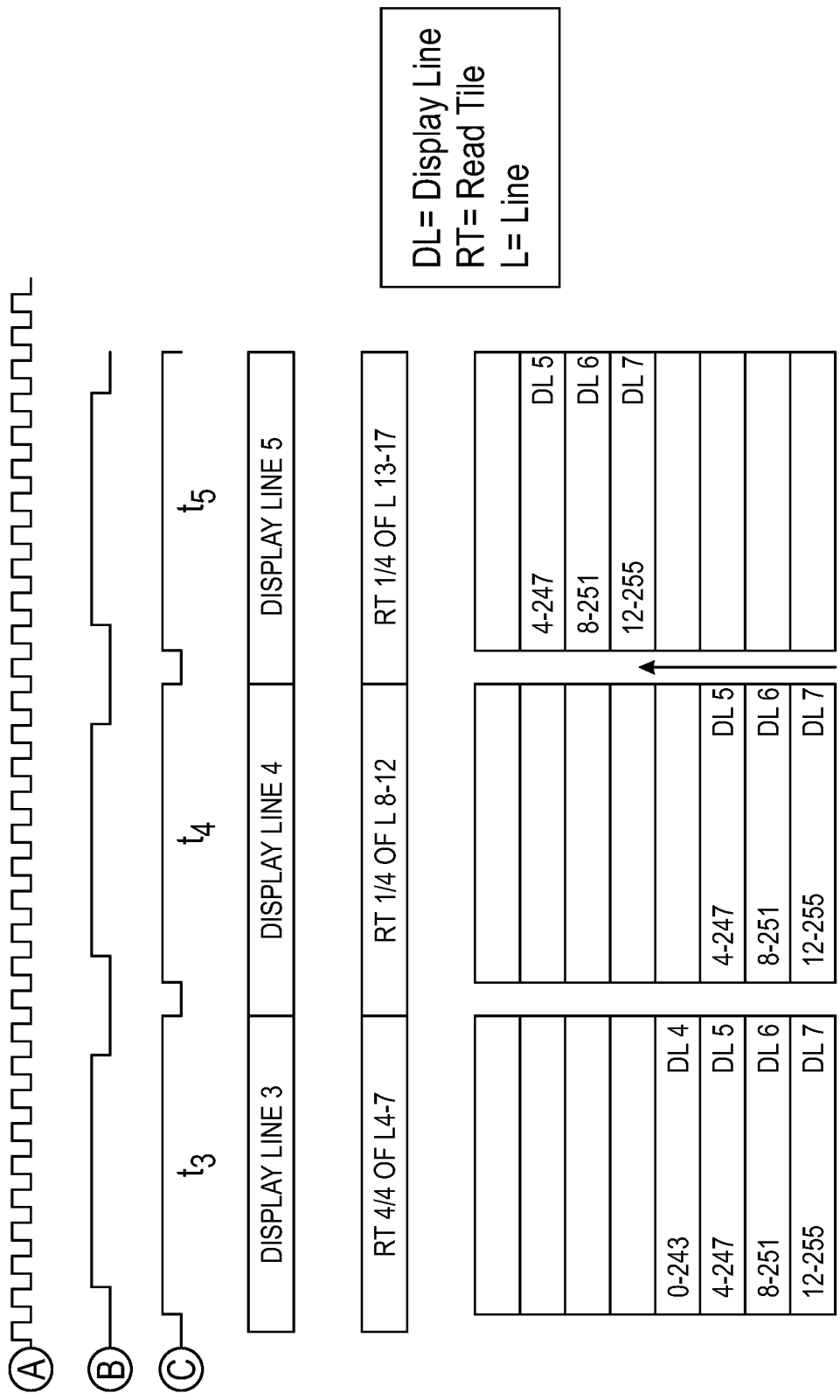

FIG. 2B shows a buffer memory diagram illustrating one way in which the rasterization of the tiled video data may be managed within the video buffer memory to present video display. The buffer memory 150 consists of eight high speed sequential storage locations, labelled buffers 0-7. Since full raster lines (DLs) are made available for presentation at the display port as one data string, the buffer width is 64 bits in connection with the data sizing presented above with reference to FIG. 2A. As an initial condition, the first four lines of video buffer memory, buffers 0-3 have been written to (e.g., by the display circuitry 13') and contain the data for displaying the entire luma tile data group 27, in rasterize organization within each buffer. DL0 is held within buffer 0, and DLs 1-3 are held within buffers 1-3 respectively. Specifically, the resultant initial condition is that the display circuitry 13' has read from main video memory and populated DL0 as presented at 32 in FIG. 2A and writes that display line (DL0) into buffer 0. Likewise, the next three display lines from the luma tiles (DL1, DL2, and DL3) are read tile-by-tile, concatenated into DL video data streams as display lines and written into buffers 1-3 to complete the initialization.

In one example, a display device is driven by control signals 140 which direct the presentation of the raster lines on the display device and the reading/writing of the video buffer memory. Clock signal 142 drives the IC device 10 and operates the IC device 10 in 10 clock-cycle time periods one of which is shown as time period 143. Five such display time periods, t0-t5, are shown in FIG. 2B. Additional video control and read/write signals are used within each display time period to coordinate the actual reading and writing of data to and from the video buffer memory and present the raster data to the display port and subsequently the video display. The signal HSYNC (horizontal synchronization signal) 146 corresponds a display line of a display device. Based on HSYNC 146 having logic 1, the HSYNC 146 is active, a corresponding display line of a display device is active, and based on HSYNC 146 having a logic 0, the HSYNC 146 is inactive, and the corresponding display line is not active for updating. For example, a display device includes one or more display lines that are updated during a display frame. Each of the display lines includes one or more pixels. To update the pixels of a display line, a HSYNC 146 having a logic 1 is driven onto the display line, and the other HSYNC 146 driven on the other display lines is held at a logic 0 so that the corresponding pixels are not updated. While not illustrated, a VSYNC (vertical synchronization signal) signal is used to indicate the beginning and/or ending of a display frame. To indicate the beginning of a display frame, the VSYNC signal is pulsed (e.g., transitioned from a low voltage to a high voltage and then to a low voltage). DATAEN (data enable signal) 144 is a seven clock-pulse signal within each clock cycle 143. A logic 1 status on DATAEN delineates the time during which video memory may be written.

In one example, at the beginning of clock cycle t0, the video processor reads DL0 from buffer 0 of video buffer memory 150 and transmits it to the display port for presentation on the video display. When HSYNC 146 is at logic 1, DL0 is updated on the display device. Further, when the HSYNC 146 is at logic 1, and when DATAEN 144 is also at logic 1 within t0, the display circuitry 13' writes the four, quarter raster lines (quarter display lines—QDLs 260) from the next tile group, the Cb tile group 28, into the first data positions (0:15) within buffers 4-7 respectively. In one example, DL4 raster elements from tiles 0-3 of Cb tile group 28 are read and written into the first 16 locations of buffer 4, DL5 raster elements from tiles 0-3 of Cb tile group 28 are read and written into the first 16 locations of buffer 5. DL6 raster elements from tiles 0-3 of Cb tile group 28 are read and written into the first 16 locations of buffer 6, and DL7 raster elements from tiles 0-3 of Cb tile group 28 are read and written into the first 16 locations of buffer 7. By way of example, the resulting following rasters are sequentially present in buffer 4, locations 0:15: rasters 0-3:16-19:32-35: 48-51. This is likewise for the respective raster data and corresponding memory areas as presented in the first 16 locations within buffers 5-7.

When HSYNC 146 at a logic 1 is driven on the next display line, the beginning of the next clock cycle t1 begins, and the next display line is updated. At this transition, the display circuitry 13' reads DL 1 from video buffer memory 150, buffer 1, and presents it to the display port for display on a display device. Again, when HSYNC 146 is a logic 1, and when DATAEN 144 is also at logic 1 within t1, the display circuitry 13' loads the second four, quarter raster lines from the next tile group, the Cb tile group 28, into the data positions beginning at 16-31 within buffers 4-7 respectively. That is, DL4 raster elements from tiles 4-7 of Cb tile group 28 are read and written into the next 16 locations of buffer 4, DL5 raster elements from tiles 4-7 of Cb tile group 28 are read and written into the next 16 locations of buffer 5, DL6 raster elements from tiles 4-7 of Cb tile group 28 are and written into the next 16 locations of buffer 6, and DL7 raster elements from tiles 4-7 of Cb tile group 28 are read and written into the next 16 locations of buffer 7. By way of example, the resulting following rasters are sequentially present: in buffer 4, locations 16:31: 64-67:80-83:96-99: 112-115. This is likewise for the respective raster data and corresponding memory areas as presented in the next 16 locations within buffers 5-7.

At the end of t1 the two raster lines of the video buffer memory 150 have been read out, leaving two free raster buffers—buffers 0/1—into which additional data may be written. However the next display lines to be read out and displayed are already fully present in buffers 2 and 3 respectively. Further, additional data pertaining to the next four raster display lines D4-D7 needs to be written into video buffer memory 150 to at least complete DL4 by the time DL 3 is read out for display. Clock cycles t2 and t3 are used for this purpose and operate to read and write to the video buffer memory 150 in exactly the same manner as described above. Within clock cycle t2, DL 2 is read out of video buffer memory 150 for display updating and the third quarter raster lines for DLs 4-7 are written into the appropriate portions of the video buffer memory 150. Within clock cycle t3, DL 3 is read out of video buffer memory 150 for display and the fourth and final quarter raster lines for DLs 4-7 are written into the appropriate portions of the video buffer memory 150. At the end, at clock cycle t3, the next four, fully rasterized display lines DL4-DL7 populate buffers 4-7 and are ready for presentation in clock cycles t4-t7.

In one or more examples, 8 full raster lines of video buffer memory are reserved to implement memory management and display line presentation method of FIG. 2B. More precisely, since one full display line is read out during the same clock cycle in which three full display lines are stored within video buffer memory 150 and the first four quarter raster display lines are read in, the actual minimum video buffer size is 7 full raster display lines. The read out of raster data can be forced to precede any writing to the video memory and buffers can be shifted or buffer indices realigned to accommodate the next data to be input. In either case, and regardless of the number of buffers chosen, there are open and unused memory locations within the video buffer memory at each stage of the memory management process used to implement the display rasterization. In fact, the unused memory of this memory management technique is a constant equivalent to three raster lines or about 96 Kbytes of data in the example of FIG. 2B.

In the following, a memory management method is described for tile-to-raster conversion in which the total amount of required video buffer storage is reduced and the unused portions of that memory are minimized. As previously described, the memory used for tile-to-raster conversions may be instantiated in various places on the video processing system, but are primarily contained in the MMI 13. The example of FIG. 2B shows that memory in the size of three lines of raster data is always unused. In a high definition video system (e.g., a display resolution of 1920× 1080 or greater), the amount of unused memory is costly both in terms of used silicon space as well as the power requirements to support that unused memory. In providing for the circuit elements that configure the video buffer memory, significantly silicon area and power budget saving may be achieved by using an improved memory management system and method, e.g., a method that has a smaller latent memory use.

The memory management example of FIG. 2B is a limited, reduced-in-size version of the overall processing used in high definition, video display systems. In a 4K resolution, for example, there are about 4,000 by about 2,000 pixels (or more), which results in over 8,000,000 pixels per color frame, each with 3 frames per video image, each image being displayed at 60 image frames per second or greater. In sum, this image rasterization requires a great deal of buffer memory to manage the overall video image display. Three-sevenths of the overall memory in a 4 k image in unused in memory amounts to a large amount (e.g., 3072 k) of unused memory.

Figure 3A:
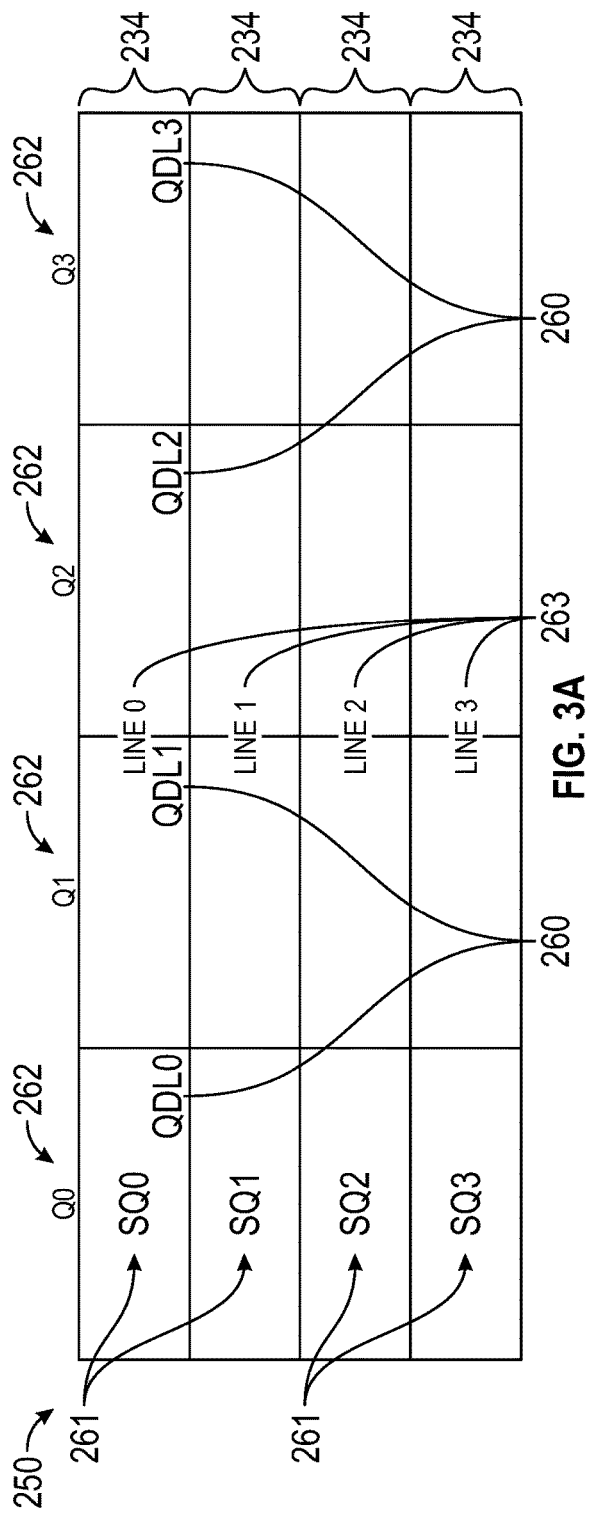
FIG. 3A shows another computer memory organization illustrating another method of video data storage according to certain aspects of the present disclosure.

FIG. 3A provides an improved organization for a video buffer memory 250 The nomenclature of TABLE 1 below is provided with reference to FIGS. 3 and 4:

TABLE 1

DEFINITIONS

| Label (element no.) | Description |
| --- | --- |
| Tile (264) | A NxM block of data, where N is the number of columns and M is the number of rows |
| DL (224) | Display Line. A raster line of pixels that is eventually sent to a display device. |
| L (234) | Line size (for example, 4096 pixel for a 4K image) |
| TL (230) | A tiled line. A tiled line is L (= 4096) pixels, shared over M lines as shown below. If N = 4096 and M = 4, the T-L shall span 1024 pixels of each line (1024x4 = 4096 pixels) |
| Q (262) | A quartile = the pixels occupied by a TL |

As shown, video buffer memory 250 of FIG. 3A comprises four lines of memory 263 each of size L 234. Video buffer memory Ls are further divided quartiles 262. Each quartile 262 is equal in size and is sized to store a TL 230. In operation, each quartile 262 contains a set of pixels occupied by a TL 230. A sub-quartile (SQ) 261 is a quartile divided by M. Hence, the video buffer memory 250 of FIG. 3A has the capability of storing four TLs within 16 SQs [SQ0:SQ15].

A quarter display line (QDL) 260 is one quarter of a display line as stored within an SQ. Within the video buffer memory 250, an individual pixel can be addressed by a combination of a line offset, a quartile offset, and a pixel offset. To keep track of the pixels in each SQ, a map is used. For M=4, a map showing that the first quartile of DL 0 is mapped to location L0, Q0 would appear as follows: MAP [DL0][QDL0]=(L0, Q0).

Figure 3B:
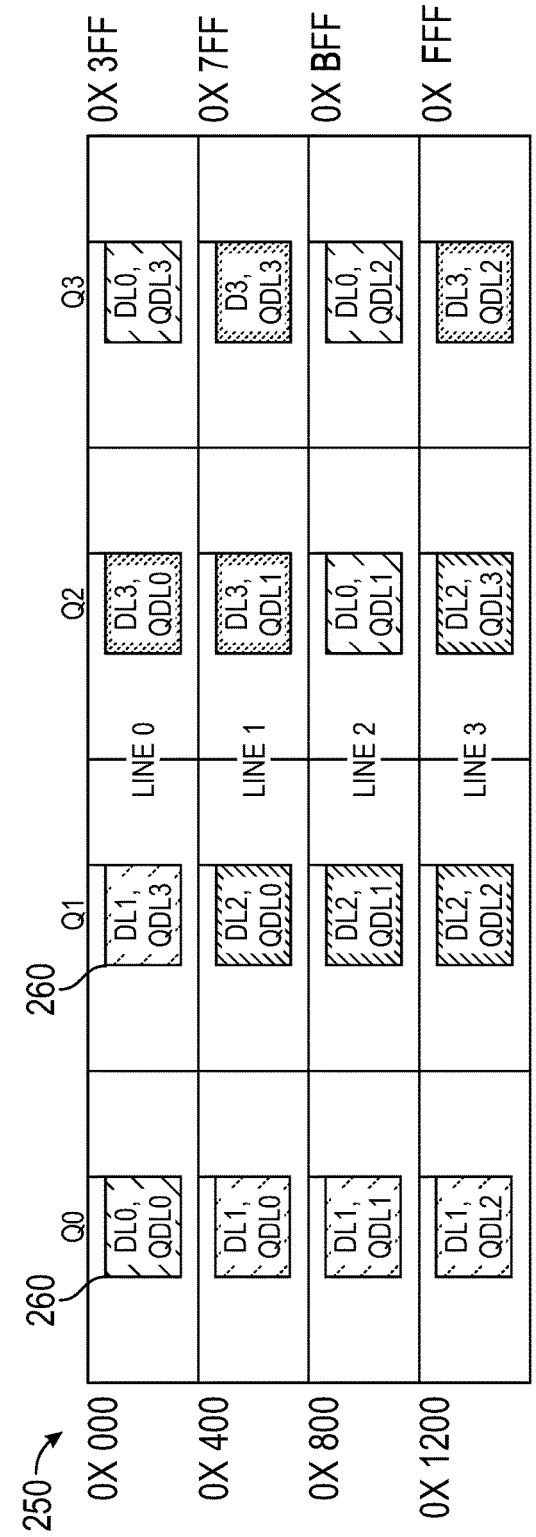
FIG. 3B shows the computer memory organization of FIG. 3A as populated with video data according to certain aspects of the present disclosure.

FIG. 3B illustrates, a random assignment of four display lines (DLs) over the video buffer memory 250. Each DL is divided into 4 QDLs 260. Each QDL can occupy any of the SQ locations in the memory map. The corresponding map is also shown below. The actual assignment of data is as follows:

MAP(DL0, QDL0)=(L0, Q0) corresponding to: address 0x0; pixels 0 through 1023 of display line 0 which is mapped to physical SRAM address 0x0 through 0x3ff (assuming 8 bits per pixel).

MAP(DL0, QDL1)=(L2, Q2) corresponding to address: pixels 1024 through 2047 of display line 0 which is mapped to physical SRAM address 2*4096 (line offset)+2*1024 (Quartile offset)=SRAM address 0x2800 and the data for QDL1 extending through SRAM address 0x2bff.

Continuing with an analogous tile size example as that of FIG. 2B and assuming that M=4 (for example 64x4 tiles), map of 4 lines in the DDR SRAM is shown in Table 2 below. The layout is annotated with DL/QDL to show how the physical memory maps the display line.

Full memory address spectrum is ADDR=0x0 to ADDR=0xFFF and divided among the lines as shown in FIG. 3B.

TABLE 2

| DL Map | | | |
| --- | --- | --- | --- |
| MAP (L0,Q0) = (DL0,QDL0) | MAP (L0,Q1) = (DL1,QDL3) | MAP (L0,Q2) = (DL3,QDL0) | MAP (L0,Q3) = (DL0,QDL3) |
| MAP (L1,Q0) = (DL1,QDL0) | MAP (L1,Q1) = (DL2,QDL0) | MAP (L1,Q2) = (DL3,QDL1) | MAP (L1,Q3) = (DL3,QDL3) |
| MAP (L2,Q0) = (DL1,QDL1) | MAP (L2,Q1) = (DL2,QDL1) | MAP (L2,Q2) = (DL0,QDL1) | MAP (L2,Q3) = (DL0,QDL2) |
| MAP (L3,Q0) = (DL1,QDL2) | MAP (L3,Q1) = (DL2,QDL2) | MAP (L3,Q2) = (DL2,QDL3) | MAP (L3,Q3) = (DL3,QDL2) |

The operation of the two tile line buffer is like that of an associative cache. A TL fetched by the display circuitry 13' from the DDR SRAM will consist of 4 QDLs, one each per display line. The display circuitry 13' determines four free locations in the DDR SRAM and writes the quartiles into each of the four locations. As with a cache-line, an entire QDL is written into a single location. To this end, only 16 map entries need to be managed to store two full DLs.

Figure 5:
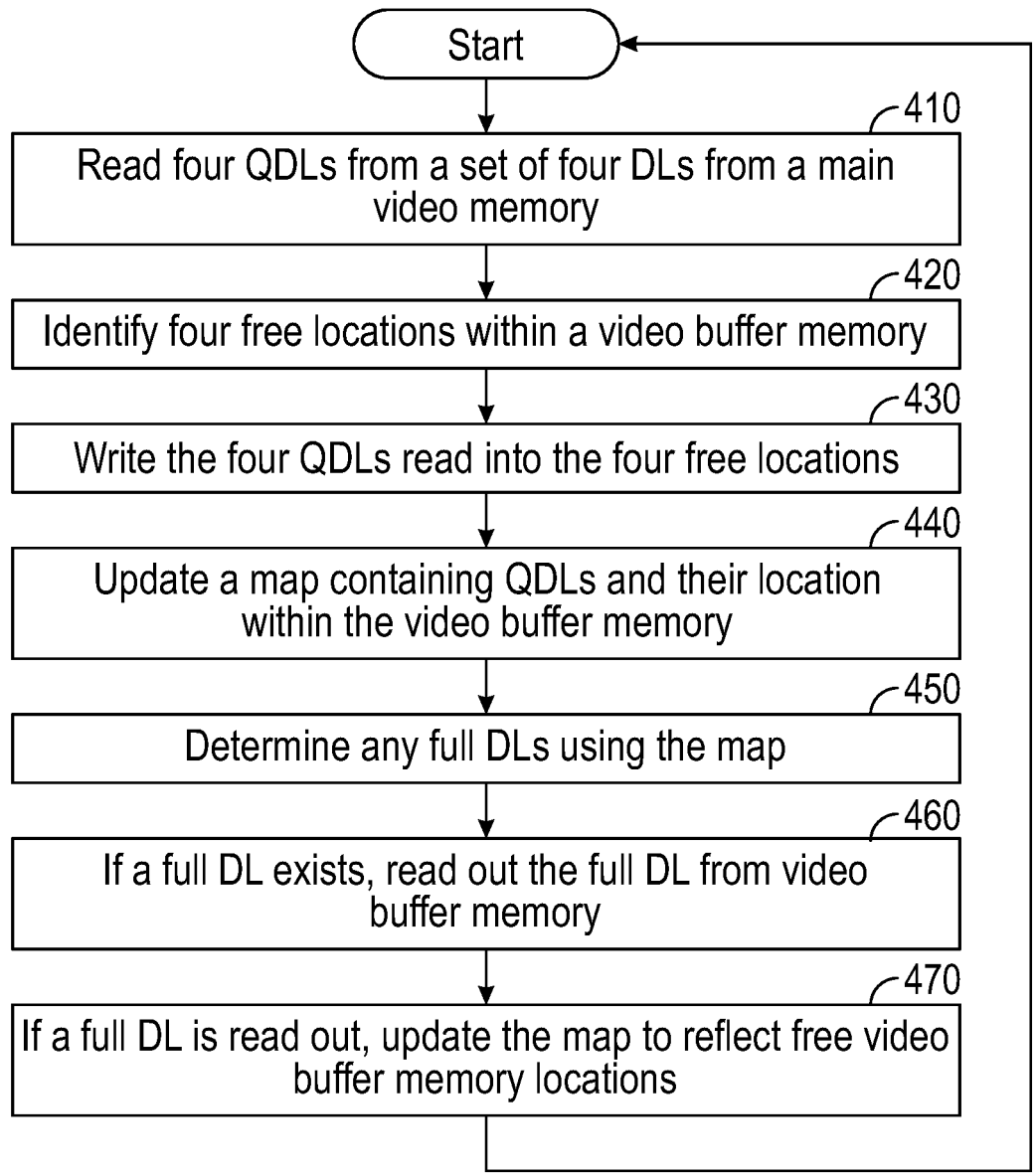
FIG. 5 is a process flow diagram showing an implementation method according to certain aspects of the present disclosure.

FIG. 5 provides a flow diagram illustrating the method of the disclosure according to one aspect. At the first step 410, four QDLs constituting a portions of four DLs thereof are read from a main video memory. The display circuitry 13' then identifies four free locations within the video buffer memory at step 420. The display circuitry 13' then writes the four QDLs to the four free locations at step 430. The display circuitry 13' then updates a map containing the QDLs stored at step 440 and the corresponding buffer video locations. The display circuitry 13' then determines, using the map, the availability of any full DLs within the video buffer memory for display using the map at step 450. If a full DL exists, then the video processor reads out the full DL at step 460, and updated the map at step 470 to reflect newly open memory locations.

When writing into the video buffer memory 250, the display circuitry 13' writing to the buffer consists of the following steps:
  Determine four free memory locations.
  Write each pixel to the corresponding location.
  Update the map for the display line.
  For example, if slots 0, 4, 8, and 12 are available, the vid display circuitry 13' writes DL0_0, DL0_1, . . . DL0_1023 to slot-0, DL1_0, DL1_1 . . . DL1_1023 to slot 4, and finally DL3_0, DL3_1 . . . DL3_1023 to slot 12.

When writing into the video buffer memory 250, the display circuitry 13' reading from the buffer consists of the following steps:
  Look up the map with the key given by (DL and QDL). (This gives the starting address of the QDL)
  Begin reading from the starting address, updating the address by number of bytes read.

Figure 4G:
FIG. 4G shows the computer memory organization of FIG. 4F in a next state of data processing according to certain aspects of the present disclosure.

FIGS. 4A-4M show one use scenario for the present memory management method. At FIG. 4A initial state condition 301 for the memory is one in which the video buffer memory 350 (e.g., the video memory 13" of FIG. 1) is empty, or alternatively, contains no valued and indexed meaningful data. In one At FIG. 4B the display circuitry 13' reads the first four quarter lines (QDLs) of the first four display lines and writes them sequentially to the video buffer memory 350 beginning at address 0X000 according to the following MAP[DL0, QDL0; DL1, QDL0; DL2, QDL0; DL3, QDL0]=(L0, SQ0; L0, SQ1; L0, SQ2; L0, SQ3) at 310. Thus, each of the so indicated QDLs is written into the first four quartiles in the first line of the video buffer memory at L0. The shading of FIG. 4B illustrates that there are four different QDLs written into the first four TL positions at L0.

At FIG. 4C the display circuitry 13' reads the second four quarter lines (QDLs) of the first four display lines and writes them sequentially to the video buffer memory 350 beginning at address 0X400 according to the following MAP[DL0, QDL1; DL1, QDL1; DL2, QDL1; DL3, QDL1]=(L1, SQ0; L1, SQ1; L1, SQ2; L1, SQ3) at 312. Thus, each of the indicated QDLs is written into the second four quartiles in the second line of the video buffer memory at L1. The shading of FIG. 4C illustrates that there are four different QDLs written into the second four TL positions.

At FIG. 4D the display circuitry 13' reads the third four quarter lines (QDLs) of the first four display lines and writes them sequentially to the video buffer memory 350 beginning at address 0X800 according to the following MAP[DL0, QDL2; DL1, QDL2; DL2, QDL2; DL3, QDL2]=(L2, SQ0; L2, SQ1; L2, SQ2; L2, SQ3) at 314. Thus, each of the indicated QDLs is written into the third four quartiles in the third line of the video buffer memory at L2. The shading of FIG. 4D illustrates that there are four different QDLs written into the third four TL positions.

At FIG. 4E, the display circuitry 13' reads the fourth four quarter lines (QDLs) of the first four display lines and writes them sequentially to the video buffer memory 350 beginning at address 0XC00 according to the following MAP[DL0, QDL3; DL1, QDL3; DL2, QDL3; DL3, QDL3]=(L3, SQ0; L3, SQ1; L3, SQ2; L3, SQ3) at 326. Thus, each of the indicated QDLs is written into the fourth four quartiles in the third line of the video buffer memory at L2. However, the display circuitry 13', at this stage, determining that there is a full DL0 present in Q0, reads out DL0 for transmission to a display port for display on a display device, leaving Q0 319 "empty" (or without valued and indexed data). FIG. 4E illustrates that there are three remaining DLs (DL1, DL2, and DL3) now populating the video buffer memory in sequential Quartiles Q1, Q2 and Q3 respectively.

At FIG. 4F, the display circuitry 13' reads the first four quarter lines (QDLs) of the second group of four display lines and writes them to the video buffer memory 350 MAP[DL4, QDL0; DL5, QDL0; DL6, QDL0; DL7, QDL0]=(L0, SQ0; L1, SQ0; L2, SQ0; L3, SQ0) at 330. However, as in FIG. 4E, the display circuitry 13', at this stage, realizing that there is a full DL1 present in Q1, subsequently reads out DL1 for transmission to the display port for display on a display device, leaving Q1 332 "empty" (or without valued and indexed data). FIG. 4F illustrates that there are four different QDLs written into the first quartile Q0 at 330.

At FIG. 4G, the display circuitry 13' reads the second four quarter lines (QDLs) of the second group of four display lines and writes them to the video buffer memory 350 MAP[DL4, QDL1; DL5, QDL1; DL6, QDL1; DL7, QDL1]=(L0, SQ1; L1, SQ1; L2, SQ1; L3, SQ1) at 334. However, as in FIG. 4F, the display circuitry 13', at this stage, realizing that there is a full DL2 present in Q2, subsequently reads out DL2 for transmission to the display port for display on a display device, leaving Q2 336 "empty" (or without valued and indexed data). FIG. 4G illustrates that there are four different QDLs written into the first quartile Q1 at 334.

Figure 4H:
FIG. 4H shows the computer memory organization of FIG. 4G in a next state of data processing according to certain aspects of the present disclosure.

At FIG. 4H, the display circuitry 13' reads the third four quarter lines (QDLs) of the second group of four display lines and writes them to the video buffer memory 350 MAP[DL4, QDL2; DL5, QDL2; DL6, QDL2; DL7, QDL2]=(L0, SQ2; L1, SQ2; L2, SQ2; L3, SQ2) at 338. However, as in FIG. 4G, the display circuitry 13', at this stage, determining that there is a full DL3 present in Q3, subsequently reads out DL3 for transmission to the display port for display on a display device, leaving Q3 340 "empty" (or without valued and indexed data). FIG. 4H illustrates that there are four different QDLs written into the second quartile Q1 at 338.

At FIG. 4I, the display circuitry 13' reads the fourth four quarter lines (QDLs) of the second group of four display lines and writes them to the video buffer memory 350 MAP[DL4, QDL3; DL5, QDL3; DL6, QDL3; DL7, QDL3]=(L0, SQ3; L1, SQ3; L2, SQ3; L3, SQ3) at 342. However, as in FIG. 4H, the display circuitry 13', at this stage, realizing that there is a full DL3 present in L0. subsequently reads out L0 for transmission to the display port for display on a display device, leaving L0 344 'empty' (or without valued and indexed data). The shading of FIG. 4 illustrates that there are three remaining QDLs written into the fourth quartile Q3 at 342.

At FIG. 4J, similar to the reading and writing illustrated in FIG. 4B, the display circuitry 13' reads the first four quarter lines (QDLs) of the third group of four display lines (DLs 8:11) and writes them to the video buffer memory 350 MAP[DL8, QDL0; DL9, QDL0; DL10, QDL0; DL11 QDL0]=(L0, SQ0; L0, SQ1; L0. SQ2; L0, SQ3) at 346. Each of the QDLs is written into the first four quartiles in the first line of the video memory buffer L0 since those locations are now free. However, the display circuitry 13', at this stage, realizing that there is a full DL5 present in video buffer line 1, subsequently reads out line 1 348 for transmission to the display port for display on a display device, leaving line 1

348 "empty" (or without valued and indexed data). The shading of FIG. 4J illustrates that there are four different QDLs written into the first four TL positions at L0 at 346.

Figure 4K:
FIG. 4K shows the computer memory organization of FIG. 4J in a next state of data processing according to certain aspects of the present disclosure.

At FIG. 4K, similar to the reading and writing illustrated in FIG. 4C, the display circuitry 13' reads the second four quarter lines (QDLs) of the third group of four display lines and writes them to the video buffer memory 350 MAP[DL8, QDL1; DL9, QDL1; DL10, QDL1; DL11 QDL1]=(L1, SQ0; L1, SQ1; L1, SQ2; L1, SQ3) at 351. Each of the QDLs is written into the first four quartiles in the second line of the video memory buffer L1 since those locations are now free. However, the display circuitry 13'. at this stage, realizing that there is a full DL6 present in video buffer line 2, subsequently reads out line 2 352 for transmission to the display port for ultimate display leaving line 2 352 "empty" (or without valued and indexed data). The shading of FIG. 4K illustrates that there are four different QDLs are written into the second four TL positions at L1 at 351.

Figure 4L:
FIG. 4L shows the computer memory organization of FIG. 4K in a next state of data processing according to certain aspects of the present disclosure.

At FIG. 4L, similar to the reading and writing illustrated in FIG. 4D, the display circuitry 13' reads the third four quarter lines (QDLs) of the third group of four display lines and writes them to the video buffer memory 350 MAP[DL8, QDL2; DL9, QDL2; DL10, QDL2; DL11 QDL2]=(L2, SQ0; L2, SQ1; L2, SQ2; L2, SQ3) at 354. Each of the QDLs is written into the first four quartiles in the third line of the video memory buffer L2 since those locations are now free. However, the display circuitry 13', at this stage, determining that there is a full DL7 present in video buffer line 3, subsequently reads out line 3 356 for transmission to the display port for display on a display device, leaving line 3 356 "empty" (or without valued and indexed data). FIG. 4L illustrates that there are four different QDLs are written into the third four TL positions at L2 at 354.

Figure 4M:
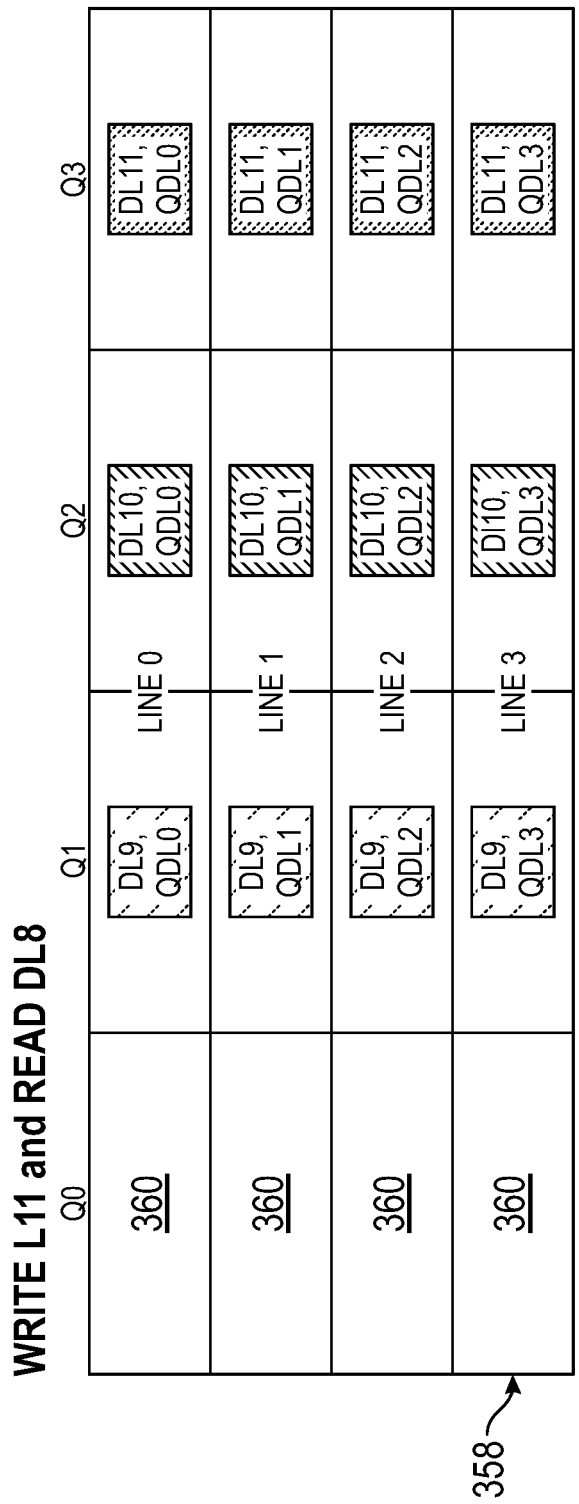
FIG. 4M shows the computer memory organization of FIG. 4L in a next state of data processing according to certain aspects of the present disclosure.

To complete a full cycle, at FIG. 4M, similar to the reading and writing illustrated in FIG. 4E, the display circuitry 13' reads the forth four quarter lines (QDLs) of the third group of four display lines and writes them to the video buffer memory 350 MAP[DL8, QDL3; DL9, QDL3; DL10, QDL3; DL11 QDL3]=(L3, SQ0; L3, SQ1; L3, SQ2; L3, SQ3) at 358. Each of the QDLs is written into the first four quartiles in the fourth line of the video memory buffer L3 since those locations are now free. However, the display circuitry 13', at this stage, determining that there is a full DL present in video buffer Q1, subsequently reads out Q1 360 for transmission to the display port for display on a display device, leaving Q1 360 "empty" (or without valued and indexed data). The shading of FIG. 4M illustrates that there are three remaining QDLs written into the three positions [L3, Q1-3].

The entire cycle of reads and writes to video buffer memory, continuing as in the fashion following FIG. 4E can be carried out to process the remaining image DLs. As shown, using the alternative, horizontal-vertical storage arrangements of the QDLs in the 16 locations within video buffer memory 350, and the remaining lines can be written into and read out of that memory using only four TLs. Further, unused memory of this memory management technique is never grater that one raster line (DL) of data space. This is in contrast to the total buffer size of 8 TLs (actually 7 TLs as described above), including three (3) unused raster lines of data, that are needed when using the method disclosed in connection with FIG. 2B. Thus an improved and memory efficient apparatus and method are provided in connection with the display of high-definition video images in a video display system.

It should be appreciated that the display circuitry 13' may also be programmed to operate in a fully set-associative manner, i.e., QDLs may be read and written randomly into any of the 16 [L,Q] locations within memory 350. While the above-illustrated horizontal-to-vertical-to-horizontal, reading-and-writing of memory 350 efficient and orderly, it is not a necessary aspect of the disclosure.

It should further be appreciated that while the disclosure has been made with reference to group of 4 DL, and QDLs with 16 location video buffer memories, the disclosure is scalable to any power-of-2 ($2^n$) within a digital video system. E.g. 8×8; 16×16 etc. video buffer sizes may be used to manage 8 DLs or 16 DLs per processing cycle using the method of the disclosure.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various processes in methods described above may be performed by any suitable means capable of performing the corresponding process functions. Such means may include various hardware and/or software component(s) and/or module(s), including, but not limited to a circuit, a FPGA or other programmable logic, an ASIC, or another processor type. Generally. where there are operations illustrated in figures, those operations may have corresponding counterpart means-plus-function components with similar numbering.

It is also to be understood that the present disclosure may be implemented in various forms of hardware, software, firmware, special purpose processors, or a combination thereof. In some examples, the present disclosure is implemented in a FPGA designed using a software suite design package to configure specific hardware circuits. The design programs may be uploaded to, and executed by, a machine comprising any suitable architecture. The machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code, configured hardware or part of the program (or combination thereof) which is executed via the operating system of the computer platform. In addition, various other peripheral devices may be connected to the computer platform such as an additional data storage device and a printing device.

It should be appreciated that disclosure is protocol agnostic and hardware independent. Thus, the systems, apparatus and methods disclosed herein can be applied to any transmission protocol. Further, the structure of the disclosed memory management system is not limited to a particular memory size or display resolution, and it may also be applied to other memory management applications It is to be understood that, because some of the constituent system components and method steps depicted in the accompanying figures are preferably implemented in software, the actual connections between the system components (or the process steps) may differ depending upon the manner in which the present disclosure is programmed. Specifically. any of the computers or devices may be interconnected using any existing or later-discovered networking technology and may also all be connected through a lager network system, such as a corporate network, metropolitan network or a global network, such as the internet.

In the preceding, reference is made to aspects presented in this disclosure. However, the scope of the present disclosure is not limited to specific described aspects. Instead, any combination of the described features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim. In other words, other and further examples may be devised without departing from the basic scope of the present disclosure, and the scope thereof is determined by the claims that follow.

What is claimed is:

1. An integrated circuit (IC) device comprising:
a video buffer memory comprising a buffer memory map, the video buffer memory configured to store one or more raster lines of video data organized as tiled lines, each of the tiled lines including two quartiles; and
display driver circuitry coupled to the video buffer memory, wherein the display driver circuitry is configured to:
write data associated with a portion of a first data line to a first one of the two quartiles of a first one of the tiled lines, and update the buffer memory map;
determine a full display line being present within the video buffer memory based on the buffer memory map; and
output the full display line to a display device.

2. The IC device of claim 1, wherein the display driver circuitry is further configured to indicate an available quartile of the two quartiles based on outputting the full display line.

3. The IC device of claim 1, wherein the display driver circuitry is configured to write the full display line as a horizontal video raster line based on a horizontal sync signal.

4. The IC device of claim 1, wherein the two quartiles are disposed in rows and columns, and writing the data associated with the portion of the first data line to the first one of the two quartiles comprises writing the data associated with the portion of the first data line a first row of the rows.

5. The IC device of claim 4, wherein the display driver circuitry is further configured to write data associated with a portion of a second data line to a first column of the columns based on outputting the full display line, wherein the first row and the first column have a quartile in common.

6. The IC device of claim 1, wherein the two quartiles are disposed in rows and columns, and writing the data associated with the portion of the first data line to the first one of the two quartiles comprises writing the data associated with the portion of the first data line to a first column of the columns.

7. The IC device of claim 6, wherein the display driver circuitry is further configured to write data associated with a portion of a second data line to a first row of the rows based on outputting the full display line, wherein the first row and the first column have a quartile in common.

8. A method comprising:
storing one or more raster lines of video data within a video buffer memory, wherein the video buffer memory is organized as tiled lines, each tiled line including two quartiles;
writing data associated with a portion of a first data line to a first one of the two quartiles of a first one of the tiled lines;
updating a buffer memory map of the video buffer memory;
determining a full display line being present within the video buffer memory based on the buffer memory map; and
outputting the full display line to a display device.

9. The method of claim 8 further comprising indicating an available quartile of the two quartiles based on outputting the full display line.

10. The method of claim 8 further comprising writing the full display line as a horizontal video raster line based on a horizontal sync signal.

11. The method of claim 8, wherein the two quartiles are disposed in rows and columns, and writing the data associated with the portion of the first data line to the first one of the two quartiles comprises writing the data associated with the portion of the first data line to a first row of the rows.

12. The method of claim 11 further comprising writing data associated with a portion of a second data line to a first column of the columns based on outputting the full display line, wherein the first row and the first column have a quartile in common.

13. The method of claim 8, wherein the two quartiles are disposed in rows and columns, and writing the data associated with the portion of the first data line to the first one of the two quartiles comprises writing the data associated with the portion of the first data line to a first column of the columns.

14. The method of claim 13 further comprising writing data associated with a portion of a second data line to a first row of the rows based on outputting the full display line, wherein the first row and the first column have a quartile in common.

15. A display driver circuitry configured to:
write data associated with a portion of a first data line to a first one of two quartiles of tiled lines;
update a buffer memory map of a video buffer memory, wherein the video buffer memory is configured to store one or more raster lines of video data and is organized as tiled lines;
determine a full display line being present within the video buffer memory based on the buffer memory map; and
output the full display line to a display device.

16. The display driver circuitry of claim 15, wherein the display driver circuitry is further configured to indicate an available quartile of the two quartiles based on outputting the full display line.

17. The display driver circuitry of claim 15, wherein the two quartiles are disposed in rows and columns, and writing the data associated with the portion of the first data line to the first one of the two quartiles comprises writing the data associated with the portion of the first data line to a first row of the rows.

18. The display driver circuitry of claim 17, wherein the display driver circuitry is further configured to write data associated with a portion of a second data line to a first column of the columns based on outputting the full display line, wherein the first row and the first column have a quartile in common.

19. The display driver circuitry of claim 15, wherein the two quartiles are disposed in rows and columns, and writing the data associated with the portion of the first data line to the first one of the two quartiles comprises writing the data associated with the portion of the first data line to a first column of the columns.

20. The display driver circuitry of claim 19, wherein the display driver circuitry is further configured to write data associated with a portion of a second data line to a first row of the rows based on outputting the full display line, wherein the first row and the first column have a quartile in common.

* * * * *